Patented Dec. 24, 1929

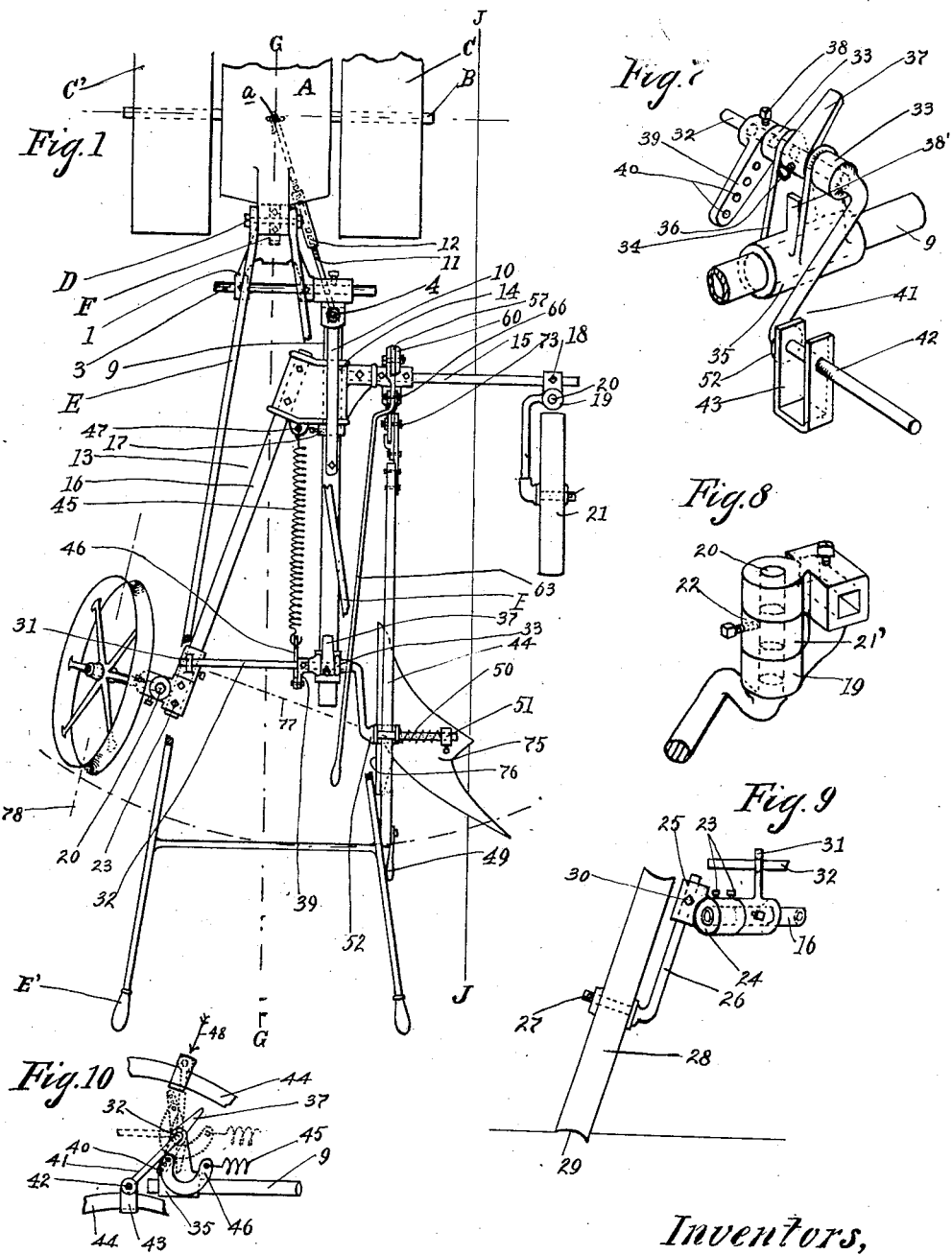

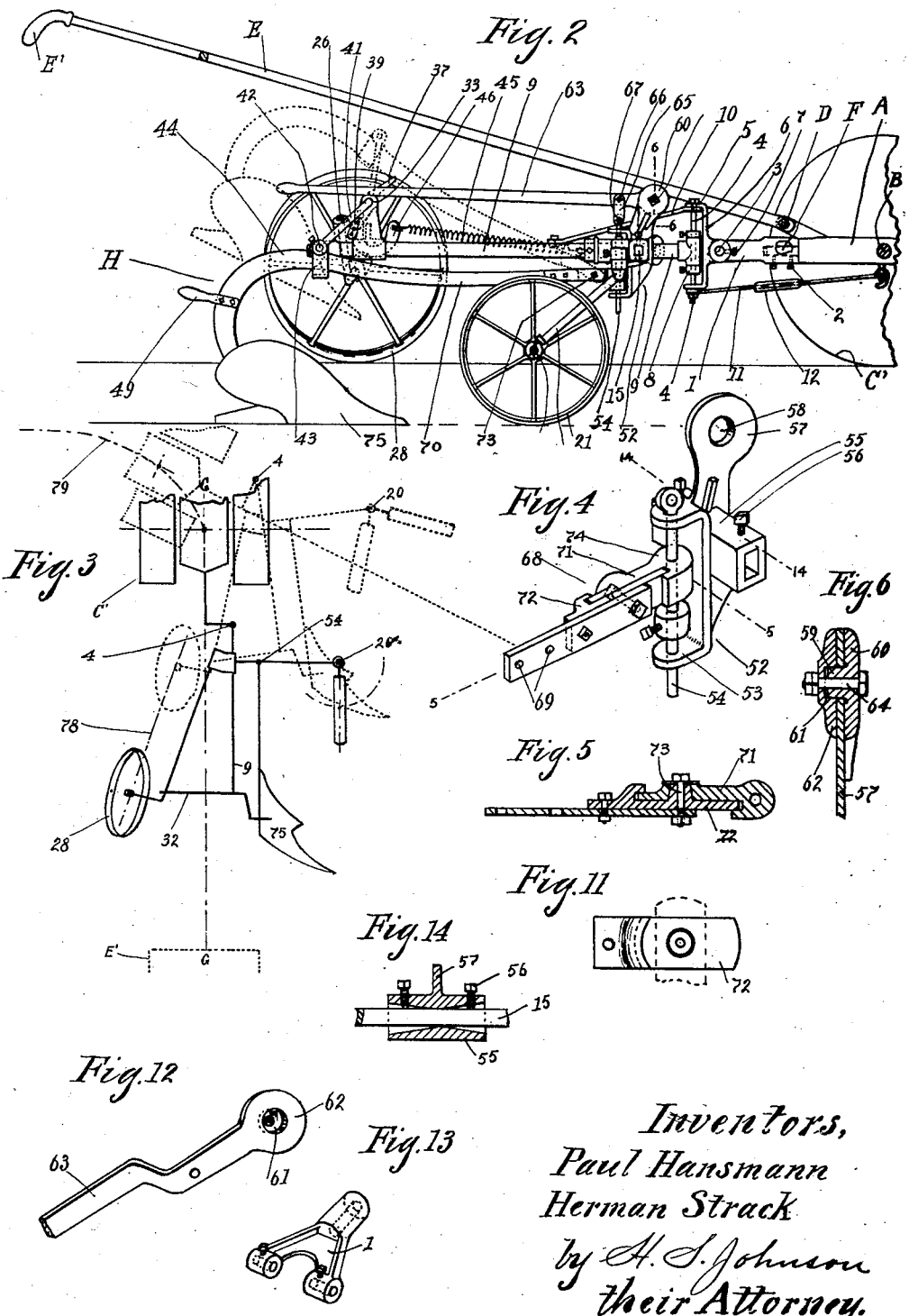

1,740,589

UNITED STATES PATENT OFFICE

PAUL HANSMANN AND HERMAN STRACK, OF LONG PRAIRIE, MINNESOTA, ASSIGNORS. BY MESNE ASSIGNMENTS, TO THE SAID HANSMANN

ANTI-SIDE-DRAFT PLOW HITCH

Application filed August 13, 1921. Serial No. 491,890.

This invention relates generally to a plow hitch construction suitable for use with tractors of the two-wheel type.

A general object of the invention is to provide means for coupling a plow to the tractor in an offset relation such as will permit both wheels of the tractor to travel on unplowed ground, thereby eliminating the tilting of the tractor which takes place when one of the tractor wheels travels in the furrow.

The invention consists in the provision of a plow hitch construction which causes the plow to travel in a path outside the adjacent tractor wheel, the unbalancing condition which thus tends to be created being counteracted by a ground element which takes the form of a wheel so formed as to grip the surface of the unplowed land and provide a balancing condition of the plow.

The ground element referred to is mounted at a widely separated disposition with relation to the plow so that a condition of stable equilibrium is established and the side draft condition which ordinarily accompanies the operation of the plow is wholly eliminated.

The invention also includes a provision for vertical swinging movement of the plow with relation to the tractor, this vertical oscillating movement being provided through the addition of a ground engaging wheel carried by the framework at the side opposite to that where the ground engaging element is located.

Other features of the invention will be hereinafter referred to.

In the drawings, in which a preferred embodiment of the invention has been selected for illustration, Figure 1 is a plan view of a two wheel tractor partly broken away, having our improved plow hitch attached thereto.

Figure 2 is a side elevation of same.

Figure 3 is a diagram showing, in solid lines, the hitch and tractor as it appears when plowing in a straight ahead course, and in dotted lines, one position they assume when turning.

Figure 4 is a perspective view of a part of the plow raising mechanism.

Figure 5 is a sectional view on line 5—5 of Figure 4.

Figure 6 is an enlarged vertical sectional view on line 6—6 of Figure 2.

Figure 7 is a perspective view of another part of the plow raising mechanism.

Figure 8 is a fragmentary perspective view of the vertical journal of the furrow wheel.

Figure 9 is an end elevation of the furrow wheel showing its mounting on the frame.

Figure 10 is a fragmentary view of the locking mechanism for the plow raising device.

Figure 11 is a side view of one of the members forming a vertically pivoted extension to the plow beam.

Figure 12 is a perspective view of the friction end of the plow lifting lever.

Figure 13 is a perspective view of the yoke detachably attached to the tractor, and Figure 14 is a vertical sectional view on line 14—14 of Figure 4.

Referring to the drawings for a more detailed description of the invention, a tractor of the two-wheel type is shown at A on the axle B of which the traction wheels C and C' are mounted. A pair of handle members E are connected directly to the tractor framework through a horizontal pivot pin D. A short stub shaft F projects rearwardly from the center line of the tractor framework and provides a draw bar head to which the plow hitch construction hereafter described is attached.

The plow hitch construction includes a yoke member 1 which is attached to the stub shaft F by means of the set screws 2. The yoke member 1 supports a transversely extending bar 3 at its rearward end. The transverse bar 3 in turn supports a yoke member 6 attached to the bar through the set screw 7. The yoke member 6 supports a vertical pivot pin 4 to which is hinged the forward end of a longitudinally extending frame member 9 which forms one of the main frame members of the plow supporting framework. A collar 8 on the pivot pin 4 supports the connection of the frame member 9 therewith and the frame member is capable of swinging about the pivot pin 4 as a center as will be seen. A brace rod 10 extends between the upper end of the pivot pin 4 and a point on the frame member 9 to give rigidity to the construction. An additional brace rod 11 extends from the lower end of the pivot rod 4 forwardly to a point in the tractor framework and a turn buckle 12 mounted on the rod 11 is utilized to vary the length thereof and to adjust the position of the yoke member 6 on the transverse rod 3.

A diagonally extending frame member 16 is mounted at its forward end in a sleeve member 14 which has a pivotal mounting on the frame member 9, being held in position thereon by means of the collar 17. The sleeve member 14 also provides a support for one end of a squared bar 15 which projects toward the plowed land side of the apparatus and provides a support for a ground engaging wheel 21 which is pivotally mounted at 20 in a bracket 19 attached to the bar 15 by means of the set screw 18.

The rearward end of the diagonally extending frame member 16 provides a support for a ground engaging wheel 28 which is so formed as to cut into the surface of the unplowed land and prevent lateral swinging of the plow framework in that direction. The wheel 28 is carried by a bracket member 26 which is supported at its upper end in a sleeve 25 attached to the rearward extremity of the frame member 16. The sleeve member 25 has a sleeve member 24 extending at right angles thereto and adapted to be fitted to the frame member 16 and to be attached thereto by means of the set screws 23.

It will be seen that the balancing or ground wheel 28 is located substantially opposite the rearward extremity of the longitudinally extending frame member 9 and a crank shaft 32 is pivotally supported on both frame members 9 and 16 and extends across the space separating the frame members at their rearward ends. A bracket member 31 mounted on the frame member 16 provides a support for the corresponding end of the crank shaft 32 while a bracket 35 carried by the frame member 9 supports the other end of the crank shaft 32. The crank shaft 32 terminates in a crank member 41 which has a connection at 42 with a bracket member 43 carried by the plow beam 44. The crank shaft 32 has mounted thereon an adjustable stop member 37 which in a raised condition of the crank 42 and the plow beam 44 rests against a fixed stop 38′ formed on the bracket member 35, as shown in dotted lines in Figure 2 of the drawing.

A crank arm 39 is mounted on the crank shaft 32 and has pivotal engagement at its outer end with a curved link member 46 to the other end of which a coil spring 45 is connected. The spring 45 is attached at its forward end to a lug 47 formed on the sleeve member 14. This device provides a secure locking mechanism to hold the plow in its raised position as is shown in Figure 10 of the drawings. On the other hand, the spring also acts to hold the plow in its downward position. It will be clear that the two limiting positions of the curved link member 46 shown in Figure 10 are at opposite sides of the arm through which the spring is stretched in the rotation of the crank arm 39. In order to manipulate the plow and raise or lower it as desired a handle member 49 is provided which can be engaged by the hand or foot of the operator for the purpose.

In order to permit the plow to swing laterally to avoid a stone or other obstruction a spring 50 is mounted on the crank arm 42 between the collar 51 and the plow beam so that the plow can swing outwardly toward the collar against the pressure of the spring for the desired purpose.

The squared bracket rod 15 carries a sleeve member 55 which can be adjustably located along the bar 15 and attached in any desired position thereon by means of the set screw 56. The sleeve member 55 carries a yoke member 53 in which a vertical pivot pin 54 is mounted. The forward end of the plow beam 44 is provided with a pivotally carried bracket member 71 which engages the pivot pin 54 to permit lateral swinging movement of the plow about the pin as a pivot. The bracket member 71 has a hinged connection with another bracket portion 72 which is attached directly to the plow beam, the hinged connection providing for the lifting or lowering of the plow as may be desired.

In order to adjust the angular position of the plow about a longitudinal axis the sleeve member 55 is so formed as to be rocked about a longitudinal axis and with relation to the squared bar 15. This relation of parts is shown in Figure 14 of the drawing. Through this structural relation of parts the plow can be set to work in a level position regardless of the position of the pulling tractor.

In order to adjust the vertical position of the forward end of the plow beam, a hand lever 63 is provided which is pivoted at its forward end on a bracket member 57 extending upwardly from the sleeve member 55. A link connection 65 is provided between the handle member 63 and the upper end 67 of the pivot pin or pintle 54. Through this mechanism it will be seen that the pin 54 with a collar which is attached thereto can be lifted to thereby correspondingly lift the forward end of the plow beam. In order to hold the handle member in any position to which it is moved the forward end thereof is clamped against the bracket member 57 by means of a bolt 64. A friction washer 60 having a conical extension 59 which passes through an opening in the bracket member 57 and into a correspondingly shaped hole 61 in the end 62 of the handle member 63. It will be seen that a considerable degree of friction is thereby exerted between the parts which is sufficient to hold the handle in any adjusted position.

Referring to Figure 3, wherein the position of the parts in the turning movement is illustrated, it will be noted that the angularity of the ground wheel is favorable to the turning movement, it being shown in the diagram, that the wheel travels along the line 78 when traveling around the comparatively short curve 79, thereby rendering turning easy. Upon completing the turn, the device will pivot upon the ground wheel, while the caster, as indicated in dotted lines, will swing around, to accommodate the movement. It will also be noted that the tractor may be turned at right angles to the plow hitch, as the traction wheels C' cannot engage the member 16 of the lever 13, owing to its angular arrangement. This permits a quick safe turn to be made, it being impossible for the tractor to careen because, as indicated in Figure 3, the tractor draft line is still between the two wheel supports, the caster 21 having automatically swung outwardly as shown in dotted lines, whereby the tractor is effectively stabilized. If the furrow wheel were further rearward or in lateral alinement with the ground wheel, this would not be the case, the result being that a great stress is placed upon the plow pivot, and great effort required from the operator to prevent the tractor from dipping rearwardly.

It will be noted that the pivots 4 and 54 are offset relative to each other and the tractor draft line, so that they are located approximately in a diagonal line which intersects the pivot point $a$ of the tractor and crosses the plow share, said line indicating the resultant direction in which the plow share tends to travel. This tendency to move the rearward end of the plow structure to the left or toward the draft line G—G is counteracted by the ground wheel. The line J—J designates the landside of the adjacent furrow, the outer tip of the share, as shown, extending to it, the furrow line being parallel with and lying adjacent the edge of the trail of the tractor. The wheels 21 and 28, together with the crooked lever 13, constitute a truck, the lever corresponding to the usual axle or frame, which is disposed diagonally across the draw bar.

We claim:

1. In a plow hitch construction, a rearwardly extending frame member adapted to be connected at its forward end to a tractor for lateral swinging movement, a diagonally extending frame member pivotally connected at its forward end to the rearwardly extending frame member for pivotal movement about the rearwardly extending frame member as a center, a ground wheel mounted to support a rearward portion of said diagonally extending member at a point offset from the center line of draft and operative to resist lateral movement of the frame member due to side draft, a bracket member extending laterally in the opposite direction from the forward end of the diagonally extending member, a ground wheel mounted to support the outer end of the bracket, and a plow having the forward end of its beam pivotally connected to said bracket member adjacent the inner end thereof.

2. In a plow hitch construction, a rearwardly extending frame member adapted to be pivotally connected for lateral movement about a vertical axis at its forward end to a tractor, a truck having an axle member extending diagonally across said frame member and mounted to oscillate about the frame member as a center, a plow operatively connected at the forward end of its beam to a forward part of the axle, with its landside toward the frame member, a wheel at the rearward portion of the diagonally extending axle mounted to constitute a ground engaging element for resisting movement of the plow toward the unplowed land, and a wheel supporting the forward end of the diagonally extending axle.

3. In a plow hitch construction, a rearwardly extending frame member adapted to be pivotally connected for lateral movement about a vertical axis at its forward end to a tractor, a truck having an axle structure pivotally mounted on said frame member for oscillating movement about the frame member as an axis, a plow operatively connected at the forward end of its beam to said axle structure with its landside toward the frame member, a ground wheel carried by the truck at the unplowed land side of said frame member, and a caster wheel mounted to support the axle at a point outside the point of connection of the plow therewith.

4. In a plow hitch construction, a rearwardly extending frame member adapted to be pivotally connected for lateral movement about a vertical axis at its forward end to a tractor, a truck framework extending across said frame member and pivotally connected to the frame member for oscillation about the frame member as a center, a plow operatively connected at the forward end of its beam to said axle structure with its landside toward the frame member, said truck framework having a ground wheel arranged in supporting relation to a rearward portion thereof at the unplowed land side of the frame member, a caster wheel carried by a forward portion of the framework at the plowed land side of the frame member and a hand lever for bodily lifting the forward end of the plow beam.

5. An anti-side draft plow hitch for use with a tractor of the class described, a truck connected through a vertical pivot to the drawbar of the tractor having a wheel normally positioned to one side of the tractor draft line and mounted so as to travel toward said line, when the tractor is in motion, and another wheel on said truck constituting a caster on the opposite side of said draft line positioned to travel outside the tractor in advance of said first named wheel, a plow located so as to cut a furrow at the outer edge of the trail of the tractor, pivotal connections between the plow and the truck, at a point located between said draft line and caster, said truck connections between the plow and the truck including a vertical and a horizontal pivot whereby the plow is enabled to bodily move with the truck responsive to unevenness of the ground irrespective of uneven movement of the tractor.

6. In a plow hitch construction, a rearwardly extending frame member adapted to be pivotally connected for lateral movement about a vertical axis at its forward end to a tractor, a truck pivotally connected intermediate its ends to said frame member for oscillating movement about the frame member as an axis, a wheel at the unplowed land side of the frame for supporting the truck and arranged to tend to travel at an angle toward the furrow, and a caster wheel at the other side of the frame member for supporting the truck at the plowed land side of the frame member, a plow universally pivotally connected at its forward end to said truck, and means for raising or lowering the plow.

In testimony whereof we affix our signatures.

PAUL HANSMANN.
HERMAN STRACK.